United States Patent
Kishi et al.

(10) Patent No.: US 7,081,429 B2
(45) Date of Patent: *Jul. 25, 2006

(54) GAS DECOMPOSING UNIT, ELECTRODE FOR A FUEL CELL, AND METHOD OF MANUFACTURING THE GAS DECOMPOSING UNIT

(75) Inventors: Kentaro Kishi, Nakai-machi (JP); Kazunori Anazawa, Nakai-machi (JP); Chikara Manabe, Nakai-machi (JP); Masaki Hirakata, Nakai-machi (JP); Taishi Shigematsu, Nakai-machi (JP); Miho Watanabe, Nakai-machi (JP); Hiroyuki Watanabe, Nakai-machi (JP); Takashi Isozaki, Nakai-machi (JP); Shigeki Ooma, Nakai-machi (JP); Shinsuke Okada, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/857,958

(22) Filed: Jun. 2, 2004

(65) Prior Publication Data

US 2005/0090388 A1 Apr. 28, 2005

(30) Foreign Application Priority Data

Oct. 22, 2003 (JP) ............................. 2003-361850

(51) Int. Cl.
*B01J 21/18* (2006.01)
*B01J 23/00* (2006.01)
*D01F 9/12* (2006.01)
(52) U.S. Cl. ................. 502/182; 423/447.1; 423/447.2
(58) Field of Classification Search ................ 502/182; 423/447.1, 447.2
See application file for complete search history.

(56) References Cited

U.S. PATENT DOCUMENTS 6,203,814 B1 * 3/2001 Fisher et al. ................ 424/443

(Continued)

FOREIGN PATENT DOCUMENTS

| JP | A 2002-503204 | 1/2002 |
| JP | A 2002-110178 | 4/2002 |
| WO | WO 97/32571 | 9/1997 |

OTHER PUBLICATIONS

Lyubchenko et al., "Atomic force miscroscopy of DNA and bacteriophage in air, water and propanol: the role of adhesion forces," Nucleic Acids Research, vol. 21, No. 5, pp. 1117-1123, 1993, no month.

*Primary Examiner*—J. A. Lorengo
*Assistant Examiner*—Patricia L. Hailey
(74) *Attorney, Agent, or Firm*—Oliff & Berridge, PLC

(57) ABSTRACT

Provided are a gas decomposing unit and an electrode for a fuel cell capable of stably supporting a gas decomposing catalyst. A gas decomposing unit and an electrode for a fuel cell each including: a carbon nanotube structure having a mesh structure in which functional groups bonded to plural carbon nanotubes are chemically bonded to mutually cross-link the plural carbon nanotubes; and a gas decomposing catalyst supported on the carbon nanotube structure. A method of manufacturing a gas decomposing unit characterized by including: an applying step of applying, to the surface of a substrate, a solution containing plural carbon nanotubes to which functional groups are bonded; a cross-linking step of chemically bonding the functional groups to build a mesh structure in which the plural carbon nanotubes mutually cross-link; and a supporting step of forming the carbon nanotube structure supporting a gas decomposing catalyst.

37 Claims, 5 Drawing Sheets

U.S. PATENT DOCUMENTS

| | | |
|---|---|---|
| 6,205,016 B1 * | 3/2001 | Niu .............................. 361/503 |
| 6,424,134 B1 * | 7/2002 | Morishita et al. ............ 323/313 |
| 6,491,789 B1 * | 12/2002 | Niu .............................. 162/145 |
| 6,790,425 B1 * | 9/2004 | Smalley et al. ........... 423/447.1 |
| 6,841,508 B1 * | 1/2005 | Moy et al. ................... 502/174 |
| 6,866,801 B1 * | 3/2005 | Mau et al. .................. 264/29.1 |
| 6,872,681 B1 * | 3/2005 | Niu et al. .................... 502/101 |
| 6,899,945 B1 * | 5/2005 | Smalley et al. ........... 428/314.8 |
| 2003/0086858 A1 * | 5/2003 | Niu et al. ................. 423/447.1 |
| 2004/0232389 A1 * | 11/2004 | Elkovitch .................... 252/500 |
| 2005/0069701 A1 * | 3/2005 | Watanabe et al. ............ 428/364 |
| 2005/0127030 A1 * | 6/2005 | Watanabe et al. ............. 216/41 |

* cited by examiner

REACTION SCHEME FOR INTRODUCING CARBOXYLIC GROUP TO CARBON NANOTUBE

REACTION SCHEME FOR POLYMERIZATION OF CARBON NANOTUBE CARBOXYLIC ACID METHYL ESTER AND GLYCERIN BY ESTER EXCHANGE

GAS DECOMPOSING UNIT, ELECTRODE FOR A FUEL CELL, AND METHOD OF MANUFACTURING THE GAS DECOMPOSING UNIT

FIELD OF THE INVENTION AND RELATED ART STATEMENT

The present invention relates to a gas decomposing unit using a carbon nanotube structure, an electrode for a fuel cell, and a method of manufacturing the gas decomposing unit.

Carbon nanotubes (CNTs), with their unique shapes and characteristics, are being considered for various applications. A carbon nanotube has a tubular shape of one-dimensional nature which is obtained by rolling one or more graphene sheets composed of six-membered rings of carbon atoms into a tube. A carbon nanotube which is formed from one graphene sheet is called a single-wall nanotube (SWNT) while a carbon nanotube which is formed from plural graphene sheets is called a multi-wall nanotube (MWNT). SWNTs are about 1 nm in diameter whereas multi-wall carbon nanotubes measure several tens nm in diameter, and both are far thinner than their predecessors, which are called carbon fibers.

One of the characteristics of carbon nanotubes resides in that the aspect ratio of length to diameter is very large since the length of carbon nanotubes is on the order of micrometers. Carbon nanotubes are unique in their extremely rare nature of being both metallic and semiconductive because six-membered rings of carbon atoms in the carbon nanotubes are arranged into a spiral. In addition, the electric conductivity of carbon nanotubes is very high and allows a current flow at a current density of 100 $MA/cm^2$ or more.

Carbon nanotubes excel not only in electrical characteristics but also in mechanical characteristics. That is, the carbon nanotubes are distinctively tough, as attested by their Young's moduli exceeding 1 TPa, which belies their extreme lightness resulting from being formed solely of carbon atoms. In addition, the carbon nanotubes have high elasticity and resiliency resulting from their cage structure. Having such various and excellent characteristics, carbon nanotubes are very appealing as industrial materials.

Applied researches that exploit the excellent characteristics of carbon nanotubes have been heretofore made extensively. To give a few examples, a carbon nanotube is added as a resin reinforcer or as a conductive composite while another research utilizes a carbon nanotube as a probe of a scanning probe microscope. Carbon nanotubes have also been utilized as minute electron sources, field emission electronic devices, and flat displays. An application that is being developed is to use a carbon nanotube as a hydrogen storage.

Of those various applications of carbon nanotubes, application particularly attracting attention is for a gas decomposing unit.

Some metal fine particles have a catalytic reaction of decomposing a gas. To actually manufacture a gas decomposing unit that efficiently utilizes such a reaction of fine particle catalysts, it is necessary to evenly support the fine particle catalysts on a support with a large specific surface area. This action results in efficient contact between a reaction gas and a gas decomposing catalyst to provide a gas decomposing unit having high catalytic activity.

Activated carbon, a molecular sieve, or the like has been known as a support with a large specific surface area. However, those materials have complex surface shapes, so that it is difficult to evenly support fine particle catalysts on those materials.

Meanwhile, a method of supporting fine particle catalysts on a metal oxide, carbon fine powder, or the like which has been generally used as a support has been known. Of those, a carbon nanotube is believed to have not only a large specific surface area but also high abilities to adsorb and occlude a gas typified by hydrogen. Therefore, a combination of a carbon nanotube and a fine particle catalyst is expected to find applications in a gas decomposing catalyst of a fuel cell and a catalyst for environmental purification.

For example, JP 2002-110178 A discloses a method of supporting a catalyst on a carbon nanotube and an application example of a carbon nanotube supporting a catalyst for an electrode for a fuel cell or for an air cell.

SUMMARY OF THE INVENTION

However, in the publication, carbon nanotubes supporting catalysts are applied for an electrode for a fuel cell or for an air cell by applying the carbon nanotubes to a carbon sheet by spray drying. In this case, those carbon nanotubes merely contact each other in the film. The arrangement and contact state of those carbon nanotubes change owing to folding or the like to vary the impact resistance, electrical characteristics, and the like of the resultant electrode. The variations place limitations on the use of the electrode.

It is also possible to use a binder such as a resin to enhance mechanical strength. However, in this case, a supported catalyst is embedded in the resin to provide extremely poor contact between a reaction gas and the catalyst, thereby resulting in deteriorated catalytic activity. In addition, if carbon nanotubes are isolated from each other in the binder, electric conductivity is unsatisfactory. Therefore, it becomes difficult to apply the carbon nanotubes for an electrode for a fuel cell.

The present invention has been made in view of the above circumstances and provides a gas decomposing unit capable of utilizing characteristics of a carbon nanotube structure effectively.

That is, a gas decomposing unit of the present invention includes: a carbon nanotube structure having a mesh structure in which functional groups bonded to plural carbon nanotubes are chemically bonded to mutually cross-link the plural carbon nanotubes; and a gas decomposing catalyst supported on the carbon nanotube structure.

The gas decomposing unit of the present invention uses a carbon nanotube structure having a mesh structure built by plural carbon nanotubes via plural cross-linked sites. Therefore, unlike the case where a film merely filled with carbon nanotubes is used for a gas decomposing unit, there does not arise a problem in that carbon nanotubes are not fixed in a gas decomposing unit and the gas decomposing unit cannot be stably used. In addition, the gas decomposing unit of the present invention eliminates the need for using a binder to fix carbon nanotubes, so that a catalyst supported on a carbon nanotube is not embedded in a resin and the carbon nanotube structure can be used as a support for a gas decomposing catalyst. As a result, the present invention can provide various modes of gas decomposing units.

Furthermore, when the gas decomposing unit of the present invention is used as an electrode for a fuel cell, electrical characteristics can be stably obtained because carbon nanotubes mutually cross-link. When the gas decomposing unit of the present invention is used as a catalyst for environmental purification, mechanical characteristics such as folding resistance can be enhanced because carbon nanotubes mutually cross-link.

The carbon nanotube structure is preferably formed by curing a solution containing plural carbon nanotubes to which functional groups are bonded to thereby chemically bond together the plural functional groups bonded to the carbon nanotubes to form a cross-linked site.

Of those, a first structure preferable as the cross-linked site is a structure obtained by cross-linking together the plural functional groups with a cross-linking agent in the solution. More preferably, the cross-linking agent is not self-polymerizable.

If the carbon nanotube structure is formed by curing a solution as described above, the cross-linked site in which the carbon nanotubes cross-link each other can form a cross-linked structure in which residues of the functional groups remaining after the cross-linking reaction are connected to each other with a connecting group that is a residue remaining after the cross-linking reaction of the cross-linking agent.

If the cross-linking agent has a property of polymerizing with other cross-linking agents (self-polymerizability), the connecting group may contain a polymer in which two or more cross-linking agents are connected to each other. In such a case, a substantial density of the carbon nanotubes in the carbon nanotube structure decreases. Therefore, a substantial specific surface area of a carbon nanotube on which a gas decomposing catalyst is to be supported decreases to deteriorate the catalytic activity of the gas decomposing unit. In addition, sufficient electric conductivity may not be obtained when the carbon nanotube structure is used as an electrode.

On the other hand, if the cross-linking agent is not self-polymerizable, a gap between each of the carbon nanotubes can be controlled to the size of the cross-linking agent residue used. Therefore, a desired network structure of carbon nanotubes can be obtained with high duplicability. Further, reducing the size of the cross-linking agent residue can extremely narrow a gap between each of the carbon nanotubes both electrically and physically. In addition, carbon nanotubes in the structure can be densely structured.

Therefore, if the cross-linking agent is not self-polymerizable, the carbon nanotube structure of the present invention can exhibit inherent electrical characteristics or mechanical characteristics of the carbon nanotubes in an extremely high level.

In the present invention, the term "self-polymerizable" refers to a property of which the cross-linking agents may prompt a polymerization reaction with each other in the presence of other components such as water or in the absence of other components. On the other hand, the term "not self-polymerizable" means that the cross-linking agent has no such a property.

If a cross-linking agent which is not self-polymerizable is selected as the cross-linking agent, a cross-linked site, where carbon nanotubes in the coat of the present invention mutually cross-link, has primarily an identical cross-linking structure. Furthermore, the connecting group preferably employs a hydrocarbon as its skeleton, and the number of carbon atoms of the skeleton is preferably 2 to 10. Reducing the number of carbon atoms can shorten the length of a cross-linked site and sufficiently narrow a gap between carbon nanotubes as compared to the length of a carbon nanotube itself. As a result, a carbon nanotube structure of a mesh structure composed substantially only of carbon nanotubes can be obtained.

Examples of the functional group include —OH, —COOH, —COOR (where R represents a substituted or unsubstituted hydrocarbon group), —COX (where X represents a halogen atom), —$NH_2$, and —NCO. It is preferable to select at least one functional group from the group consisting of the above functional groups, and in such a case, a cross-linking agent, which may prompt a cross-linking reaction with the selected functional group, is selected as the cross-linking agent.

Further, preferable examples of the cross-linking agent include a polyol, a polyamine, a polycarboxylic acid, a polycarboxylate, a polycarboxylic acid halide, a polycarbodiimide, and a polyisocyanate. It is preferable to select at least one cross-linking agent from the group consisting of the above cross-linking agents, and in such a case, a functional group, which may prompt a cross-linking reaction with the selected cross-linking agent, is selected as the functional group.

At least one functional group and one cross-linking agent are preferably selected respectively from the group exemplified as the preferable functional group and the group exemplified as the preferable cross-linking agent, so that a combination of the functional group and the cross-linking agent may prompt a cross-linking reaction with each other.

Particularly preferable examples of the functional group include —COOR (where R represents a substituted or unsubstituted hydrocarbon group). Introduction of a carboxyl group into carbon nanotubes is relatively easy, and the resultant substance (a carbon nanotube carboxylic acid) is highly reactive. Therefore, after the formation of the substance, it is relatively easy to esterify the substance to convert its functional group into —COOR (where R represents a substituted or unsubstituted hydrocarbon group), and such a functional group easily prompts a cross-linking reaction and is suitable for formation of a coat.

A polyol can be exemplified as the cross-linking agent corresponding to the functional group. A polyol is cured by a reaction with —COOR (where R represents a substituted or unsubstituted hydrocarbon group), and forms a robust cross-linked substance with ease. Among polyols, each of glycerin and ethylene glycol reacts with the above functional groups well. Moreover, each of glycerin and ethylene glycol itself has high biodegradability, and applies a light load to an environment.

In the cross-linked site in which plural carbon nanotubes mutually cross-link, the functional group is —COOR (where R represents a substituted or unsubstituted hydrocarbon group). The cross-linked site is —COO($CH_2$)$_2$OCO— in the case where ethylene glycol is used as the cross-linking agent. In the case where glycerin is used as the cross-linking agent, the cross-linked site is —COOCH$_2$CHOHCH$_2$OCO— or —COOCH$_2$CH(OCO—)CH$_2$OH if two OH groups contribute to the cross-linking, and the cross-linked site is —COOCH$_2$CH(OCO—)CH$_2$OCO— if three OH groups contribute to the cross-linking. The chemical structure of the cross-linked site may be a chemical structure selected from the group consisting of the above four structures.

A second structure preferable as the structure of the cross-linked site is a structure formed by chemical bonding of plural functional groups. More preferably, a reaction that causes the chemical bonding is any one of dehydration condensation, a substitution reaction, an addition reaction, and an oxidative reaction.

In the carbon nanotube structure, carbon nanotubes form a cross-linked site by chemically bonding together functional groups bonded to the carbon nanotubes, to thereby form a mesh structure. Therefore, the size of the cross-linked site for bonding the carbon nanotubes becomes constant depending on the functional group to be bonded. Since a carbon nanotube has an extremely stable chemical structure, there is a low possibility that functional groups or the like excluding a functional group to modify the carbon nanotube are bonded to the carbon nanotube. In the case where the functional groups are chemically bonded together, the designed structure of the cross-linked site can be obtained, and the carbon nanotube structure can be homogeneous.

Furthermore, the functional groups are chemically bonded together, so that the length of the cross-linked site between the carbon nanotubes can be shorter than that in the case where the functional groups are cross-linked with a cross-linking agent. Therefore, the carbon nanotube structure is dense, and tends to readily produce an effect peculiar to a carbon nanotube.

In the carbon nanotube structure of the present invention, plural carbon nanotubes form a mesh structure via multiple cross-linked sites. As a result, excellent characteristics of a carbon nanotube can be stably utilized unlike a material such as a mere carbon nanotube dispersion film or a resin dispersion film in which carbon nanotubes accidentally contact each other and are substantially isolated from each other.

The chemical bonding of plural functional groups is preferably one selected from —COOCO—, —O—, —NHCO—, —COO—, and —NCH— in a condensation reaction. The chemical bonding is preferably at least one selected from —NH—, —S—, and —O— in a substitution reaction. The chemical bonding is preferably —NHCOO— in an addition reaction. The chemical bonding is preferably —S—S— in an oxidative reaction.

Examples of the functional group to be bonded to a carbon nanotube prior to the reaction include —OH, —COOH, —COOR (where R represents a substituted or unsubstituted hydrocarbon group), —X, —COX (where X represents a halogen atom), —SH, —CHO, —OSO$_2$CH$_3$, —OSO$_2$(C$_6$H$_4$)CH$_3$—NH$_2$, and —NCO. It is preferable to select at least one functional group from the group consisting of the above functional groups.

Particularly preferable examples of the functional group include —COOH. A carboxyl group can be relatively easily introduced into a carbon nanotube. In addition, the resultant substance (a carbon nanotube carboxylic acid) is highly reactive, easily causes a condensation reaction by using a dehydration condensation agent such as N-ethyl-N'-(3-dimethylaminopropyl)carbodiimide, and is thus suitable for forming a coat.

The plural carbon nanotubes are preferably multi-wall carbon nanotubes because of the following reasons. A first reason is that the particle size of a fine particle catalyst to be supported can be widely controlled. A second reason is that, when multi-wall carbon nanotubes are used as an electrode, the high electric conductivity of the multi-wall carbon nanotubes can enhance the electric conductivity of the electrode. A third reason is that, when functional groups are to be bonded, the graphene sheet structure in the internal layer is broken little, so that characteristics unique to nanotubes hardly deteriorates and the carbon nanotubes can be highly durable.

(Manufacturing Method)

Next, a method of manufacturing a gas decomposing unit according to the present invention is characterized by including: an applying step of applying, to the surface of a substrate, a solution containing plural carbon nanotubes to which functional groups are bonded; a cross-linking step of chemically bonding the functional groups to build a mesh structure in which the plural carbon nanotubes mutually cross-link; and a supporting step of forming the carbon nanotube structure supporting the gas decomposing catalyst.

By doing so, the gas decomposing catalyst can be supported on the structured carbon nanotube structure.

According to one preferable aspect of the present invention, the solution to be used in the applying step contains the gas decomposing catalyst to perform the supporting step of forming the carbon nanotube structure supporting the gas decomposing catalyst simultaneously with the step of cross-linking carbon nanotubes. This is because, in this case, gas decomposing catalysts can be evenly dispersed in the carbon nanotube structure, and the performance of the gas decomposing unit can be improved. This is also because gas decomposing catalysts can be evenly supported on the substrate even if the substrate has a complex shape (for example, the surface of the substrate has many irregularities).

An alternative to the supporting step is a method including a step of supplying the gas decomposing catalyst onto the carbon nanotube structure. A specific method of supplying the gas decomposing catalyst can be arbitrarily selected from deposition, solution coating, and the like. This method is particularly preferable in the case where, in a solution containing a carbon nanotube or in the cross-linking step, the gas decomposing catalyst to be used has an action of decomposing the carbon nanotube.

In the present invention, first, in the step of supplying a substrate with a solution containing plural carbon nanotubes having functional groups (hereinafter, referred to as "cross-linking application solution" in some cases), the whole surface of the substrate or a part of the surface of the substrate is supplied with the solution. Then, in the subsequent cross-linking step, the solution after the application is cured to form a carbon nanotube structure having a mesh structure in which the plural carbon nanotubes mutually cross-link via chemical bonding of the functional groups. Passing those two steps can stabilize the structure itself of the carbon nanotube structure on the substrate.

In forming chemical bonding between functional groups, a first method preferable for forming a cross-linked site is a method of cross-linking the functional groups with a cross-linking agent in the solution. More preferably, the cross-linking agent is not self-polymerizable.

In the method of manufacturing a gas decomposing unit of the present invention, examples of the functional group for forming the cross-linked site using the cross-linking agent include —OH, —COOH, —COOR (where R represents a substituted or unsubstituted hydrocarbon group), —COX (where X represents a halogen atom), —NH$_2$, and —NCO. It is preferable to select at least one functional group from the group consisting of the above functional groups, and in such a case, a cross-linking agent, which may prompt a cross-linking reaction with the selected functional group, is selected as the cross-linking agent.

Further, preferable examples of the cross-linking agent include a polyol, a polyamine, a polycarboxylic acid, a polycarboxylate, a polycarboxylic acid halide, a polycarbodiimide, and a polyisocyanate. It is preferable to select at least one cross-linking agent from the group consisting of the above cross-linking agents, and in such a case, a functional group, which may prompt a cross-linking reaction with the selected cross-linking agent, is selected as the functional group.

At least one functional group and one cross-linking agent are preferably selected respectively from the group exemplified as the preferable functional group and the group exemplified as the preferable cross-linking agent, so that a combination of the functional group and the cross-linking agent may prompt a cross-linking reaction with each other.

Particularly preferable examples of the functional group include —COOR (where R represents a substituted or unsubstituted hydrocarbon group). A carboxyl group can be relatively easily introduced into a carbon nanotube, and the resultant substance (a carbon nanotube carboxylic acid) is highly reactive. Therefore, after the formation of the substance, it is relatively easy to esterify the substance to convert its functional group into —COOR (where R represents a substituted or unsubstituted hydrocarbon group). The functional group easily causes a cross-linking reaction, and is suitable for the formation of a coat.

In addition, a polyol may be the cross-linking agent corresponding to the functional group. A polyol is cured by a reaction with —COOR (where R represents a substituted or unsubstituted hydrocarbon group), and forms a robust cross-linked substance with ease. Among polyols, each of glycerin and ethylene glycol reacts with the above functional groups well. Moreover, each of glycerin and ethylene glycol itself has high biodegradability, and applies a light load to an environment.

Further, a second preferable method of forming a cross-linked site is a method of chemically bonding the plural functional groups together.

With this method, the size of the cross-linked site, which bonds the carbon nanotubes together, becomes constant depending on the functional group to be bonded. A carbon nanotube has an extremely stable chemical structure, so that there is a low possibility that functional groups or the like excluding the functional groups intended for a modification are bonded to the carbon nanotube. When chemically bonding the functional groups together, the designed structure of the cross-linked site can be obtained, providing a homogeneous carbon nanotube structure.

Further, functional groups are chemically bonded together and thus the length of the cross-linked site between the carbon nanotubes can be shortened compared to the case of cross-linking the functional groups together using a cross-linking agent. Therefore, the carbon nanotube structure becomes dense, and effects peculiar to carbon nanotubes are easily obtained.

Examples of a particularly preferable reaction, which chemically bonds the functional groups together, include a condensation reaction, a substitution reaction, an addition reaction, and an oxidative reaction.

In a method of manufacturing a gas decomposing unit of the present invention, the preferable functional group includes: at least one functional group selected from the group consisting of —COOR (where R represents a substituted or unsubstituted hydrocarbon group), —COOH, —COX (where X represents a halogen atom), —OH, —CHO, and —NH$_2$ for the condensation reaction; at least one functional group selected from the group consisting of —NH$_2$, —X (where X represents a halogen atom), —SH, —OH, —OSO$_2$CH$_3$, and —OSO$_2$(C$_6$H$_4$)CH$_3$ for the substitution reaction; at least one functional group chosen from the group consisting of —OH and —NCO for the addition reaction; and —SH for the oxidative reaction.

In particular, in the method of manufacturing a gas decomposing unit of the present invention, a molecule containing the functional groups may be bonded to carbon nanotubes to be chemically bonded at the exemplified functional group portion to construct the cross-linked site.

If the reaction is dehydration condensation, a condensation agent is preferably added. Further, the preferable functional group is at least one functional group selected from the group consisting of —COOR (where R represents a substituted or unsubstituted hydrocarbon group), —COOH, —COX (where X represents a halogen atom), —OH, —CHO, and —NH$_2$.

For example, —COOH is particularly preferably used as the functional group specifically used for the condensation reaction. Introduction of a carboxyl group into carbon nanotubes is relatively easy. Moreover, the resultant substance (a carbon nanotube carboxylic acid) is highly reactive. Therefore, introduction of functional groups for forming a mesh structure into plural places of one carbon nanotube is easy. In addition, the functional groups easily prompt a condensation reaction, thus being suitable for the formation of a carbon nanotube structure.

In a gas decomposing unit manufacturing method of the present invention, the solution used in the application step may contain a solvent or the cross-linking agent may double as a solvent of the solution depending on the type of the cross-linking agent.

BRIEF DESCRIPTION OF THE DRAWINGS

Preferred embodiments of the present invention will be described in detail based on the following figures, wherein.

DETAILED DESCRIPTION OF THE PREFERRED EMBODIMENT

A specific description will be given below on the present invention through an embodiment in which a gas decomposing unit and a method of manufacturing the gas decomposing unit are described separately.

[Gas Decomposing Unit]

A gas decomposing unit of this embodiment is characterized by including: a carbon nanotube structure having a mesh structure in which plural carbon nanotubes mutually cross-link; and a gas decomposing catalyst supported on the carbon nanotube structure.

Figure 1:
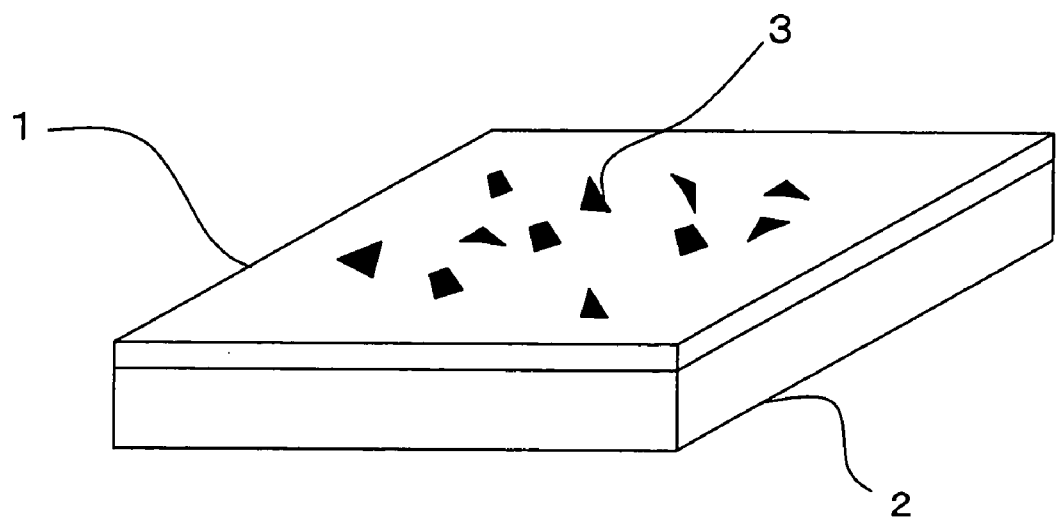
FIG. 1 is a schematic diagram of a gas decomposing unit mode according to the present invention.

FIG. 1 shows an example of a configuration of a gas decomposing unit. The gas decomposing unit is constructed by arranging, on a substrate 2, a nanotube structure 1 supporting gas decomposing fine particle catalysts 3.

A material having a property of activating a target reaction may be selected and used for the gas decomposing catalyst. Specific examples of such a material include metal fine particles such as platinum, a platinum alloy, palladium, magnesium, titanium, manganese, lanthanum, vanadium, zirconium, a nickel-lanthanum alloy, a titanium-iron alloy, iridium, rhodium, and gold. Plural different fine particle catalysts may be simultaneously supported. Although the material is preferably of a fine particle shape in order to enhance catalytic activity, the material may be of any shape except the fine particle shape as long as the shape can provide a catalytic reaction.

In particular, the base body for the gas decomposing unit is preferably flexible or pliable. Having a cross-linking structure, the carbon nanotube structure layer formed on the base body hardly breaks when the gas decomposing unit is bent and deformed. The performance of the device is therefore degraded less by deformation. A flexible or pliable substrate that has an insulating ability can be obtained from any of various resins such as polyethylene, polypropylene, polyvinyl chloride, polyamide, and polyimide.

<Carbon Nanotube Structure>

In the present invention, the phrase "carbon nanotube structure" refers to a member having a mesh structure in which plural carbon nanotubes mutually cross-link. Provided that a carbon nanotube structure can be formed in such a manner that carbon nanotubes mutually cross-link to build a mesh structure, the carbon nanotube structure may be formed by any method. However, production according to a method of manufacturing a gas decomposing unit of this embodiment to be described later can be readily performed and can provide a high-performance gas decomposing unit. Moreover, uniformization and control of characteristics can be readily performed.

A first structure for the carbon nanotube structure used as a gas decomposing unit manufactured by a method of manufacturing a gas decomposing unit to be described later is manufactured by curing a solution (cross-linking application solution) containing a carbon nanotube having a functional group and a cross-linking agent that causes a cross-linking reaction with the functional group to cause a cross-linking reaction between the functional group of the carbon nanotube and the cross-linking agent to thereby form a cross-linked site. Furthermore, a second structure for the carbon nanotube structure is manufactured by chemically bonding functional groups of carbon nanotubes to form cross-linked sites.

Hereinafter, the carbon nanotube structure layer in the gas decomposing unit of this embodiment will be described by way of examples of the manufacturing method. Unless otherwise stated, the structures of cross-linked sites are not considered.

(Carbon Nanotube)

Carbon nanotubes, which are the main component in the present invention, may be single-wall carbon nanotubes or multi-wall carbon nanotubes each having two or more layers. Whether one or both types of carbon nanotubes are used (and, if only one type is to be used, which type is selected) may be decided appropriately taking into consideration the use of the gas decomposing unit or the cost.

Carbon nanotubes in the present invention include ones that are not exactly shaped like a tube, such as: a carbon nanohorn (a horn-shaped carbon nanotube whose diameter continuously increases from one end toward the other end) which is a variant of a single-wall carbon nanotube; a carbon nanocoil (a coil-shaped carbon nanotube forming a spiral when viewed in entirety); a carbon nanobead (a spherical bead made of amorphous carbon or the like with its center pierced by a tube); a cup-stacked nanotube; and a carbon nanotube with its circumference covered with a carbon nanohorn or amorphous carbon.

Furthermore, carbon nanotubes that can be used in the present invention may be ones that contain some substances inside, such as: a metal-containing nanotube which is a carbon nanotube containing metal or the like; and a peapod nanotube which is a carbon nanotube containing a fullerene or a metal-containing fullerene.

As described above, in the present invention, it is possible to employ carbon nanotubes of any mode, including common carbon nanotubes, variants of common carbon nanotubes, and carbon nanotubes with various modifications, without a problem in terms of reactivity. Therefore, the concept of "carbon nanotube" in the present invention encompasses all of the above.

Those carbon nanotubes are conventionally synthesized by a known method, such as arc discharge, laser ablation, and CVD, and the present invention can employ any of the methods. However, of those, arc discharge in a magnetic field is preferable from the viewpoint of synthesizing a high-purity carbon nanotube.

Carbon nanotubes used in the present invention are preferably equal to and more than 0.3 nm and equal to or less than 100 nm in diameter. If the diameter of the carbon nanotubes exceeds this upper limit, the synthesis becomes difficult and costly. A more preferable upper limit of the diameter of the carbon nanotubes is 30 nm or less.

In general, the lower limit of the carbon nanotube diameter is about 0.3 nm from a structural standpoint. However, too thin a diameter could lower the synthesis yield. It is therefore preferable to set the lower limit of the carbon nanotube diameter to 1 nm or more, more preferably 10 nm or more.

The length of carbon nanotubes used in the present invention is preferably equal to or more than 0.1 μm and equal to or less than 100 μm. If the length of the carbon nanotubes exceeds this upper limit, the synthesis becomes difficult or requires a special method raising cost, which is not preferable. On the other hand, if the length of the carbon nanotubes falls short of this lower limit, the number of cross-link bonding points per carbon nanotube is reduced, which is not preferable. A more preferable upper limit of the carbon nanotube length is 10 μm or less and a more preferable lower limit of the carbon nanotube length is 1 μm or more.

The appropriate carbon nanotube content in the cross-linking application solution varies depending on the length and thickness of carbon nanotubes, whether single-wall carbon nanotubes or multi-wall carbon nanotubes are used, the type and amount of functional groups in the carbon nanotubes, the type and amount of cross-linking agents or of an additive for bonding functional groups together, the presence or absence of a solvent or other additive used and, if one is used, the type and amount of the solvent or additive, etc. The carbon nanotube content in the solution should be high enough to form an excellent coat after curing but not excessively high because the ease of applying decreases.

Specifically, the ratio of carbon nanotubes to the entire application solution excluding the mass of the functional groups is 0.01 to 10 g/l, preferably 0.1 to 5 g/l, and more preferably 0.5 to 1.5 g/l, although, as mentioned above, the ranges could be different if the parameters are different.

If the purity of carbon nanotubes to be used is not high enough, it is desirable to raise the purity by purifying the carbon nanotubes prior to preparation of the cross-linking application solution. In the present invention, the higher the carbon nanotube purity, the better the result can be. Specifically, the purity is preferably 90% or higher, more preferably, 95% or higher. When the purity is low, cross-linking agents cross-link to carbon products such as amorphous carbon and tar, which are impurities. This could change the cross-linking distance between carbon nanotubes, leading to a failure in obtaining desired characteristics. No particular limitations are put on how carbon nanotubes are purified, and any known purifying method can be employed.

(Functional Group 1)

In the first method in which the cross-linked site is formed using a cross-linking agent, carbon nanotubes can have any functional group to be connected thereto, as long as functional groups selected can be added to the carbon nanotubes chemically and can prompt a cross-linking reaction with any type of cross-linking agent. Specific examples of such functional groups include —COOR, —COX, —MgX, —X (where X represents halogen), —OR, —NR$^1$R$^2$, —NCO, —NCS, —COOH, —OH, —NH$_2$, —SH, —SO$_3$H, —R'CHOH, —CHO, —CN, —COSH, —SR, —SiR'$_3$ (where R, R$^1$, R$^2$, and R' each represent a substituted or unsubstituted hydrocarbon group). Note that employable functional groups are not limited to those examples.

Of those, it is preferable to select at least one functional group from the group consisting of —OH, —COOH, —COOR (where R represents a substituted or unsubstituted hydrocarbon group), —COX (where X represents a halogen atom), —NH$_2$, and —NCO. In that case, a cross-linking agent, which can prompt a cross-linking reaction with the selected functional group, is selected as the cross-linking agent.

In particular, —COOR (where R represents a substituted or unsubstituted hydrocarbon group) is particularly preferable. This is because a carboxyl group can be relatively easily introduced into a carbon nanotube, because the resultant substance (a carbon nanotube carboxylic acid) can be easily introduced as a functional group by esterifying the substance, and because the substance has good reactivity with a cross-linking agent.

R in the functional group —COOR is a substituted or unsubstituted hydrocarbon group, and is not particularly limited. However, R is preferably an alkyl group having 1 to 10 carbon atoms, more preferably an alkyl group having 1 to 5 carbon atoms, and particularly preferably a methyl group or an ethyl group in terms of reactivity, solubility, viscosity, and ease of use as a solvent of a paint.

The appropriate amount of functional groups introduced varies depending on the length and thickness of carbon nanotubes, whether single-wall carbon nanotubes or multi-wall carbon nanotubes are used, the types of functional groups, the use of the gas decomposing unit, etc. From the viewpoint of the strength of the cross-linked substance obtained, namely, the strength of the coat, a preferable amount of functional groups introduced is large enough to add two or more functional groups to each carbon nanotube.

How functional groups are introduced into carbon nanotubes will be explained in the section below titled [Method of Manufacturing a Gas Decomposing Unit].

(Cross-linking Agent)

Any cross-linking agent, which is an essential ingredient of the cross-linking application solution, can be used as long as the cross-linking agent is capable of prompting a cross-linking reaction with the functional groups of the carbon nanotubes. In other words, the types of cross-linking agents that can be selected are limited to a certain degree by the types of the functional groups. Also, the curing conditions (heating, UV irradiation, irradiation with visible light, natural curing, etc.) as a result of the cross-linking reaction are naturally determined by the combination of those parameters.

Specific preferable examples of the cross-linking agents include a polyol, a polyamine, a polycarboxylic acid, a polycarboxylate, a polycarboxylic acid halide, a polycarbodiimide, and a polyisocyanate. It is preferable to select at least one cross-lining agent from the group consisting of the above. In that case, a functional group which can prompt a reaction with the cross-linking agent is selected as the functional group.

At least one functional group and one cross-linking agent are particularly preferably selected respectively from the group exemplified as the preferable functional group and the group exemplified as the preferable cross-linking agent, so that a combination of the functional group and the cross-linking agent may prompt a cross-linking reaction with each other. The following Table 1 lists the combinations of the functional group of the carbon nanotubes and the corresponding cross-linking agent, which can prompt a cross-linking reaction, along with curing conditions of the combinations.

TABLE 1

| Functional group of carbon nanotube | Cross-linking agent | Curing condition |
|---|---|---|
| —COOR | Polyol | heat curing |
| —COX | Polyol | heat curing |
| —COOH | Polyamine | heat curing |
| —COX | Polyamine | heat curing |
| —OH | Polycarboxylate | heat curing |
| —OH | Polycarboxylic acid halide | heat curing |
| —NH$_2$ | Polycarboxylic acid | heat curing |
| —NH$_2$ | Polycarboxylic acid halide | heat curing |
| —COOH | Polycarbodiimide | heat curing |
| —OH | Polycarbodiimide | heat curing |
| —NH$_2$ | Polycarbodiimide | heat curing |
| —NCO | Polyol | heat curing |
| —OH | Polyisocyanate | heat curing |
| —COOH | Ammonium complex | heat curing |
| —COOH | Hydroquinone | heat curing |

*where R represents a substituted or unsubstituted hydrocarbon group
*where X represents a halogen Of those combinations, preferable is the combination of —COOR (where R represents a substituted or unsubstituted hydrocarbon group) with good reactivity on a functional group side and a polyol, which forms a robust cross-linked substance with ease. The term "polyol" in the present invention is a genetic name for organic compounds each having two or more OH groups. Of those, one having 2 to 10 (more preferably 2 to 5) carbon atoms and 2 to 22 (more preferably 2 to 5) OH groups is preferable in terms of cross-linkability, solvent compatibility when an excessive amount thereof is charged, processability of waste liquid after a reaction by virtue of biodegradability (environment aptitude), yield of polyol synthesis, and so on. In particular, the number of carbon atoms is preferably lower within the above range because a gap between carbon nanotubes in the resultant coat can be narrowed to bring the carbon nanotubes into substantial contact with each other (to bring the carbon nanotubes close to each other). Specifically, glycerin and ethylene glycol are particularly preferable, and it is preferable to use one or both of glycerin and ethylene glycol as a cross-linking agent.

From another perspective, the cross-linking agent is preferably a not-self-polymerizable cross-linking agent. In addition to glycerin and ethylene glycol as examples of the polyols, butenediol, hexynediol, hydroquinone, and naphthalenediol are not-self-polymerizable cross-linking agents. More generally, a prerequisite of the not-self-polymerizable cross-linking agent is to be without a pair of functional groups, which can prompt a polymerization reaction with each other, in itself. On the other hand, examples of a self-polymerizable cross-linking agent include one that has a pair of functional groups, which can prompt a polymerization reaction with each other (alkoxide, for example).

(Functional Group 2)

Further, in the second method of obtaining a mesh structure of mutually cross-linked carbon nanotubes, a cross-linked site of the carbon nanotube structure is formed by chemically bonding plural functional groups, in which at least one end is bonded to different carbon nanotubes respectively. In the second method, a functional group to be bonded to the carbon nanotubes is not particularly limited as long as the functional group can be chemically added to the carbon nanotubes and is capable of reacting to each other with any type of additive, and any functional group can be selected. Specific examples of the functional group include —COOR, —COX, —MgX, —X (where X represents a halogen), —OR, —NR$^1$R$^2$, —NCO, —NCS, —COOH, —OH, —NH$_2$, —SH, —SO$_3$H, —R'CHOH, —CHO, —CN, —COSH, —SR, —SiR'$_3$ (where R, R$^1$, R$^2$, and R$^3$ each represent a substituted or unsubstituted hydrocarbon group), but are not limited to those.

Of those, the preferable functional group includes: at least one functional group selected from the group consisting of —COOR (where R represents a substituted or unsubstituted hydrocarbon group), —COOH, —COX (where X represents a halogen atom), —OH, —CHO, and —NH$_2$ for the condensation reaction; at least one functional group selected from the group consisting of —NH$_2$, —X (where X represents a halogen atom), —SH, —OH, —OSO$_2$CH$_3$, and —OSO$_2$(C$_6$H$_4$)CH$_3$ for the substitution reaction; at least one functional group chosen from the group consisting of —OH and —NCO for the addition reaction; and —SH for the oxidative reaction.

Further, it is also possible to bond a molecule, which partially contains those functional groups, with the carbon nanotubes to be chemically bonded at the preferable functional group portion exemplified above. Even in this case, a functional group with a large molecular weight to be bonded to the carbon nanotubes is bonded as intended, enabling control of the length of the cross-linked site.

(Additive)

Any additive that is capable of making the functional groups of the carbon nanotubes react to each other can be mixed in the cross-linking application solution. In other words, the types of additives that can be selected are limited to a certain degree by the types of the functional groups and the reaction type. Also, the curing condition (heating, UV irradiation, irradiation with visible light, natural curing, etc.) as a result of the reaction is naturally determined by the combination of those parameters.

(Condensation Agent)

To give specific examples of preferable additives, an acid catalyst or a dehydration condensation agent, for example, sulfuric acid, N-ethyl-N'-(3-dimethylaminopropyl)carbodiimide, or dicyclohexyl carbodiimide, is preferred as a condensation agent. Preferably, at least one condensation agent is selected from the group consisting of the above. The functional groups selected have to react to each other with the help of the selected condensation agent.

(Base)

When a substitution reaction is to be utilized, a base is an essential ingredient of the cross-linking application solution. An arbitrary base is selected in accordance with the degree of acidity of hydroxyl groups.

Preferably, the base is at least one selected from the group consisting of sodium hydroxide, potassium hydroxide, pyridine, and sodium ethoxide. In that case, a functional group that can prompt a substitution reaction with the selected base is selected.

It is particularly preferable to select a combination of functional groups such that at least two functional groups from each of the example groups that are given above as examples of preferable functional groups react to each other. Table 2 below lists functional groups of carbon nanotubes and names of the corresponding reactions.

An addition reaction does not necessarily need an additive. In an oxidative reaction, an additive is not necessarily needed but adding an oxidative reaction accelerator is preferable. A specific example of the accelerator is iodine.

TABLE 2

| Bonding site | Functional group of carbon nanotube (A) | Functional group of carbon nanotube (B) | Reaction |
|---|---|---|---|
| —COOCO— | —COOH | — | Dehydration condensation |
| —S—S— | —SH | — | Oxidative reaction |
| —O— | —OH | — | Dehydration condensation |
| —NH—CO— | —COOH | —NH$_2$ | Dehydration condensation |
| —COO— | —COOH | —OH | Dehydration condensation |
| —COO— | —COOR | —OH | Dehydration condensation |
| —COO— | —COX | —OH | Dehydration condensation |
| —CH=N— | —CHO | —NH$_2$ | Dehydration condensation |
| —NH— | —NH$_2$ | —X | Substitution reaction |
| —S— | —SH | —X | Substitution reaction |
| —O— | —OH | —X | Substitution reaction |
| —O— | —OH | —OSO$_2$CH$_3$ | Substitution reaction |
| —O— | —OH | —OSO$_2$(C$_6$H$_4$)CH$_3$ | Substitution reaction |
| —NH—COO— | —OH | —N=C=O | Addition reaction |

*where R represents a substituted or unsubstituted hydrocarbon group
*where X represents a halogen Next, the content of a cross-linking agent or of an additive for bonding functional groups in the cross-linking application solution varies depending on the type of the cross-linking agent (including whether the cross-linking agent is self-polymerizable or not self-polymerizable) and the type of the additive for bonding functional groups. The content also varies depending on the length and thickness of a carbon nanotube, whether the carbon nanotube is of a single-wall type or a multi-wall type, the type and amount of a functional group of the carbon nanotube, the presence or absence, types, and amounts of a solvent and other additives and the like. In particular, for example, glycerin or ethylene glycol can also provide characteristics of a solvent because a viscosity of glycerin or ethylene glycol is not so high, and thus an excessive amount of glycerin or ethylene glycol can be added.

(Other Additive)

The cross-linking application solution may contain various additives including a solvent, a viscosity modifier, a dispersant, and a cross-linking accelerator.

A solvent is added when satisfactory application of the cross-linking application solution is not achieved with solely the cross-linking agents or the additive for bonding functional groups. A solvent that can be employed is not particularly limited, and may be appropriately selected according to the types of the cross-linking agents to be used. Specific examples of employable solvents include: organic solvents such as methanol, ethanol, isopropanol, n-propanol, butanol, methyl ethyl ketone, toluene, benzene, acetone, chloroform, methylene chloride, acetonitrile, diethyl ether, and tetrahydrofuran (THF); water; aqueous solutions of acids; and alkaline aqueous solutions. A solvent as such is added in an amount that is not particularly limited but determined appropriately by taking into consideration the ease of applying the cross-linking application solution.

A viscosity modifier is added when satisfactory application of the cross-linking application solution is not achieved with solely the cross-linking agents and the additive for bonding functional groups. A solvent that can be employed is not particularly limited, and may be appropriately selected according to the kinds of cross-linking agents and additives for bonding functional groups used. Specific examples of employable viscosity modifiers include methanol, ethanol, isopropanol, n-propanol, butanol, methyl ethyl ketone, toluene, benzene, acetone, chloroform, methylene chloride, acetonitrile, diethyl ether, and THF Some of those viscosity modifiers have the function of a solvent when added in a certain amount, and it is meaningless to clearly discriminate viscosity modifiers from solvents. A viscosity modifier as such is added in an amount that is not particularly limited but determined by taking into consideration the ease of applying the cross-linking application solution.

A dispersant is added to the cross-linking application solution in order to maintain the dispersion stability of the carbon nanotubes, the cross-linking agents, or the additive for bonding functional groups in the application solution. Various known surface-active agents, water-soluble organic solvents, water, aqueous solutions of acids, alkaline aqueous solutions, etc. can be employed as a dispersant. However, a dispersant is not always necessary since components of the coating material of the present invention have high dispersion stability by themselves. In addition, depending on the use of the coat after the formation, the presence of a dispersant and like other impurities in the coat may not be desirable. In such case, a dispersant is not added at all, or is added in a very small amount.

(Method of Preparing a Cross-linking Application Solution)

A method of preparing a cross-linking application liquid is described next.

The cross-linking application liquid is prepared by mixing, as needed, carbon nanotubes that have functional groups with a cross-linking agent that prompts a cross-linking reaction with the functional groups or an additive that causes the functional groups to form chemical bonding among themselves (mixing step). The mixing step may be preceded by an addition step in which the functional groups are introduced into the carbon nanotubes.

If carbon nanotubes having functional groups are starting materials, the preparation starts with the mixing step. If normal carbon nanotubes themselves are starting materials, the preparation starts with the addition step.

The addition step is a step of introducing desired functional groups into carbon nanotubes. How functional groups are introduced varies depending on the type of functional group. One method is to add a desired functional group directly, and another method is to introduce a functional group that is easy to attach and then substitute the whole functional group or a part thereof or attach a different functional group to the former functional group in order to obtain the objective functional group.

Still another method is to apply a mechanochemical force to a carbon nanotube to break or modify only a small portion of a graphene sheet on the surface of the carbon nanotube and introduce various functional groups into the broken or modified portion.

Cup-stacked carbon nanotubes, which have many defects on the surface upon manufacture, and carbon nanotubes that are formed by vapor phase growth are relatively easy to introduce functional groups. On the other hand, carbon nanotubes each having a perfect graphene sheet structure exert the carbon nanotube characteristics more effectively and are easier to control the characteristics. Consequently, it is preferable to use a multi-wall carbon nanotube so that appropriate defects are formed on its outermost layer for using the gas decomposing unit to thereby bond functional groups for cross-linking.

There are no particular limitations put on the addition step and any known method can be employed. Various addition methods disclosed in JP 2002-503204 A may also be employed in the present invention depending on the purpose.

A description is given on a method of introducing —COOR (where R represents a substituted or unsubstituted hydrocarbon group), a particularly preferable functional group among the functional groups listed in the above. To introduce —COOR (where R represents a substituted or unsubstituted hydrocarbon group) into carbon nanotubes, carboxyl groups may be (1) added to the carbon nanotubes once, and then (2) esterified.

(1) Addition of Carboxyl Group

To introduce carboxyl groups into carbon nanotubes, carboxyl groups are refluxed together with an acid having an oxidizing effect. This operation is relatively easy and is preferable since carboxyl groups with high reactivity are attached to carbon nanotubes. A brief description of the operation is given below.

An acid having an oxidizing effect is, for example, concentrated nitric acid, hydrogen peroxide water, a mixture of sulfuric acid and nitric acid, or aqua regia. When concentrated nitric acid is used, in particular, the concentration is preferably 5 mass % or higher, more preferably, 60 mass % or higher.

A normal reflux method can be employed. The temperature at which reflux is performed is preferably set to a level near the boiling point of the acid used. When concentrated nitric acid is used, for instance, the temperature is preferably set to 120 to 130° C. The reflux preferably lasts 30 minutes to 20 hours, more preferably, 1 hour to 8 hours.

Carbon nanotubes to which carboxyl groups are attached (carbon nanotube carboxylic acids) are generated in the reacted solution after the reflux. The reacted solution is cooled down to room temperature and then receives a separation operation or washing as necessary, thereby obtaining the objective carbon nanotube carboxylic acid.

(2) Esterification

The target functional group —COOR (where R represents a substituted or unsubstituted hydrocarbon group) can be introduced by adding an alcohol to the obtained carbon nanotube carboxylic acid and dehydrating the mixture for esterification.

The alcohol used for the esterification is determined according to R in the formula of the functional group. That is, if R is $CH_3$, the alcohol is methanol, and if R is $C_2H_5$, the alcohol is ethanol.

A catalyst is generally used in the esterification, and a conventionally known catalyst such as sulfuric acid, hydrochloric acid, or toluenesulfonic acid can also be used in the present invention. The use of sulfuric acid as a catalyst is preferable from a view of not prompting a side reaction in the present invention.

The esterification may be conducted by adding an alcohol and a catalyst to a carbon nanotube carboxylic acid and refluxing the mixture at an appropriate temperature for an appropriate time period. A temperature condition and a time period condition in this case depend on type of a catalyst, type of alcohol, or the like and cannot be simply determined, but a reflux temperature close to the boiling point of the alcohol used is preferable. The reflux temperature is preferably in the range of 60 to 70° C. for methanol, for example. Further, a reflux time period is preferably in the range of 1 to 20 hours, more preferably in the range of 4 to 6 hours.

A carbon nanotube with the functional group —COOR (where R represents a substituted or unsubstituted hydrocarbon group) added can be obtained by separating a reaction product from a reacted solution after esterification and washing the reaction product as required.

The mixing step is a step of mixing, as required, carbon nanotubes having functional groups with a cross-linking agent prompting a cross-linking reaction with the functional groups or an additive for bonding the functional groups to prepare the cross-linking application solution. In the mixing step, other components described in the aforementioned section titled [Gas Decomposing Unit] are mixed, in addition to the carbon nanotubes having functional groups and the cross-linking agents. Then, preferably, an amount of a solvent or of a viscosity modifier is adjusted considering ease of applying to prepare the cross-linking application solution just before application.

Simple stirring with a spatula and stirring with a stirrer of a stirring blade type, a magnetic stirrer, and a stirring pump may be used. However, to achieve higher degree of uniformity in dispersion of the carbon nanotubes to enhance storage stability while fully extending a mesh structure by cross-linking of the carbon nanotubes, an ultrasonic disperser or a homogenizer may be used for powerful dispersion. However, when using a stirring device with a strong shear force of stirring such as a homogenizer, there arises a risk of cutting and damaging the carbon nanotubes in the solution, thus the device may be used for a very short time period.

A carbon nanotube structure is formed by applying to a substrate surface the cross-linking application solution described above and curing the substrate. An applying method and a curing method are described in detail in the section below titled [Method of Manufacturing a Gas Decomposing Unit].

The carbon nanotube structure in the present invention is in a state where carbon nanotubes are networked. In detail, the carbon nanotube structure is cured into a matrix shape, carbon nanotubes are connected to each other via cross-linked sites, and characteristics of a carbon nanotube itself such as high electron- and hole-transmission characteristics can be exerted sufficiently. In other words, the carbon nanotube structure has carbon nanotubes that are tightly connected to each other, contains no other binders and the like, and is thus composed substantially only of carbon nanotubes, so that characteristics peculiar to a carbon nanotube are fully utilized.

A thickness of the carbon nanotube structure in the present invention when the structure is shaped into a layer can be widely selected from being very thin to being thick according to an application. Lowering the carbon nanotube content in the cross-linking application solution used (simply, lowering the viscosity by diluting) and applying the cross-linking application solution in a thin coat form allows a very thin coat to be obtained. Similarly, raising the carbon nanotube content allows a thick structure to be obtained. Further, repeating the application allows an even thicker structure to be obtained. Formation of a very thin coat from a thickness of about 10 nm is possible, and formation of a thick coat without an upper limit is possible through recoating. A possible coat thickness with one coating is about 5 μm. Further, a desired shape of the structure can be obtained by injecting the cross-linking application solution, in which a content or the like is adjusted, to a mold and bonding.

In the carbon nanotube structure, when using the cross-linking agent of the first method, a site where the carbon nanotubes cross-link together, that is, the cross-linked site formed by a cross-linking reaction between the functional groups of the carbon nanotubes and the cross-linking agents has a cross-linking structure. In the cross-linking structure, residues of the functional group remaining after the cross-linking reaction are connected together with a connecting group, which is a residue of the cross-linking agent remaining after the cross-linking reaction.

As described, the cross-linking agent, which is a component of the cross-linking application solution, is preferably not self-polymerizable. If the cross-linking agent is not self-polymerizable, the carbon nanotube structure layer finally manufactured will be constructed from a residue of only one cross-linking agent. The gap between the carbon nanotubes to be cross-linked can be controlled to the size of a residue of the cross-linking agent used, thereby providing a desired network structure of the carbon nanotubes with high duplicability. Further, plural cross-linking agents are not present between the carbon nanotubes, thus enabling an enhancement of a substantial density of the carbon nanotubes in the carbon nanotube structure. Further, reducing the size of a residue of the cross-linking agent can extremely narrow a gap between each of the carbon nanotubes both electrically and physically (carbon nanotubes are substantially in direct contact with each other).

When forming the carbon nanotube structure layer with a cross-linking application solution prepared by selecting a single functional group of the carbon nanotubes and a single not-self-polymerizable cross-linking agent, the cross-linked site of the layer will have the same cross-linking structure (Example 1). Further, even when forming the carbon nanotube structure layer with a cross-linking application solution prepared by selecting plural types of functional groups of the carbon nanotubes and/or plural types of not-self-polymerizable cross-linking agents, the cross-linked site of the layer will mainly have a cross-linking structure based on a combination of the functional group and the not-self-polymerizable cross-linking agent mainly used (Example 2).

In contrast, when forming the carbon nanotube structure layer with a cross-linking application solution prepared by selecting self-polymerizable cross-linking agents, without regard to whether the functional groups and the cross-linking agents in the carbon nanotubes are of single or plural types, the cross-linked site of the layer where carbon nanotubes cross-link together will not mainly have a specific cross-linking structure. This is because the cross-linked site will be in a state where numerous connecting groups with different connecting (polymerization) numbers of the cross-linking agents coexist.

In other words, by selecting not-self-polymerizable cross-linking agents, the cross-linked sites, where the carbon nanotubes of the carbon nanotube structure layer cross-link together, bond with the functional group through a residue of only one cross-linking agent, thus forming a mainly identical cross-linking structure. "Mainly identical" here is a concept including a case with all of the cross-linked sites having an identical cross-linking structure as described above (Example 1), as well as a case with the cross-linking structure based on a combination of the functional group and the not-self-polymerizable cross-linking agent mainly used becomes a main structure with respect to the whole cross-linked site as described above (Example 2).

When referring as "mainly identical", a "ratio of identical cross-linked sites" to the whole cross-linked sites will not have a uniform lower limit defined. The reason is that a case of imparting a functional group or a cross-linking structure with an aim different from formation of a carbon nanotube network may be assumed for example. However, in order to actualize high electrical or physical characteristics peculiar to carbon nanotubes with a strong network, a "ratio of identical cross-linked sites" to the total cross-linked sites is preferably 50% or more, more preferably 70% or more, further more preferably 90% or more, and most preferably 100%, based on numbers. Those number ratios can be determined through, for example, a method of measuring an intensity ratio of an absorption spectrum corresponding to the cross-linking structure with an infrared spectrum.

As described, if a carbon nanotube structure layer has the cross-linked structure with a mainly identical cross-linking site where carbon nanotubes cross-link, a uniform network of the carbon nanotubes can be formed in a desired state. In addition, the carbon nanotube network can be constructed with homogeneous, satisfactory, and expected electrical or physical characteristics and high duplicability.

Further, the connecting group preferably contains hydrocarbon for a skeleton thereof. "Hydrocarbon for a skeleton" here refers to a main chain portion of the connecting group consisting of hydrocarbon, the main portion of the connecting group contributing to connecting residues together of the functional groups of carbon nanotubes to be cross-linked remaining after a cross-linking reaction. A side chain portion, where hydrogen of the main chain portion is substituted by another substituent, is not considered. Obviously, it is more preferable that the whole connecting group consist of hydrocarbon.

The number of carbon atoms in the hydrocarbon is preferably 2 to 10, more preferably 2 to 5, and further more preferably 2 to 3. The connecting group is not particularly limited as long as the connecting group is divalent or more.

In the cross-linking reaction of the functional group —COOR (where R represents a substituted or unsubstituted hydrocarbon) and ethylene glycol, exemplified as a preferable combination of the functional group of carbon nanotubes and the cross-linking agent, the cross-linked site, where plural carbon nanotubes cross-link each other, becomes —COO(CH$_2$)$_2$OCO—.

Further, in the cross-linking reaction of the functional group —COOR (where R represents a substituted or unsubstituted hydrocarbon) and glycerin, the cross-linked site, where plural carbon nanotubes cross-link each other, becomes —COOCH$_2$CHOHCH$_2$OCO— or —COOCH$_2$CH(OCO—)CH$_2$OH if two OH groups contribute to the cross-link, and the cross-linked site becomes —COOCH$_2$CH(OCO—)CH$_2$OCO— if three OH groups contribute to the cross-link.

As has been described, the carbon nanotube structure layer has a mesh structure that is composed of plural carbon nanotubes connected to each other through plural cross-linked sites. Thus, the contact or arrangement of carbon nanotubes is not disturbed, unlike a mere carbon nanotube dispersion film. Therefore, there are stably obtained characteristics that are unique of carbon nanotubes, including: electrical characteristics such as high electron- and hole-transmission characteristics; physical characteristics such as thermal conductivity and toughness; and light absorption characteristics.

Further, in the second method of forming the cross-linked site through chemically bonding plural functional groups, in which at least one end is bonded to different carbon nanotubes respectively, the carbon nanotube structure has carbon nanotubes connected in a matrix form through a cross-linked portion. Therefore, characteristics of carbon nanotubes, such as high electron- and hole-transmission characteristics, are easily obtained. That is, the carbon nanotube structure has carbon nanotubes that are tightly connected together, and contains no other binders and the like. Therefore, the carbon nanotube structure can be composed substantially only of carbon nanotubes.

Further, the cross-linked sites are formed by a reaction among the functional groups, thus enabling an enhancement of the actual carbon nanotube density of the carbon nanotube structure. If the functional groups are reduced in size, the carbon nanotubes can be brought very close to each other both electrically and physically, and characteristics of a carbon nanotube itself can be more easily obtained.

Further, cross-linked sites are chemical bonding of the functional groups, thus the carbon nanotube structures mainly have the same cross-linking structure. Therefore, a uniform network of carbon nanotubes can be formed into a desired state. Therefore, electrical and physical carbon nanotube characteristics that are homogeneous and excellent can be obtained. Furthermore, electrical or physical characteristics expected from carbon nanotubes, or close to the expected level or with high duplicability, can be obtained.

A layer except the carbon nanotube structure layer may be formed in the gas decomposing unit of the present invention. For example, placing an adhesive layer between the surface of the substrate and the carbon nanotube structure layer for enhancing adhesiveness therebetween can improve the adhesive strength of a patterned carbon nanotube structure layer, and is thus preferable. In addition, the periphery of the carbon nanotube structure can be coated with an insulator, an electric conductor, or the like according to gas decomposing unit applications.

As has been described, the base body may be a flexible or pliable substrate. Employing a flexible or pliable substrate as the base body improves the overall flexibility of the gas decomposing unit and makes it possible to use the gas decomposing unit in a much wider range of environments (where to install and the like).

If the gas decomposing unit having a flexible or pliable substrate is used to build an apparatus, the gas decomposing unit can function as a conducting wire while conforming to various configurations and shapes in the apparatus.

Specifics of the above-described gas decomposing unit of the present invention including its shape will be made clear in the following section of [Method of Manufacturing a Gas Decomposing Unit] and Examples. Note that the descriptions below show merely examples and are not to limit specific modes of the gas decomposing unit of the present invention.

[Method of Manufacturing a Gas Decomposing Unit]

A method of manufacturing a gas decomposing unit of the present invention is a method suitable for manufacture of the above-described gas decomposing unit of the present invention. Specifically, the method of manufacturing a gas decomposing unit of the present invention includes: (A) an applying step of applying to the surface of a substrate a solution that contains plural carbon nanotubes having functional groups connected thereto; and (B) a cross-linking step of chemically bonding the functional groups to form a carbon nanotube structure layer that has a mesh structure where the plural carbon nanotubes cross-link each other.

Figure 2:
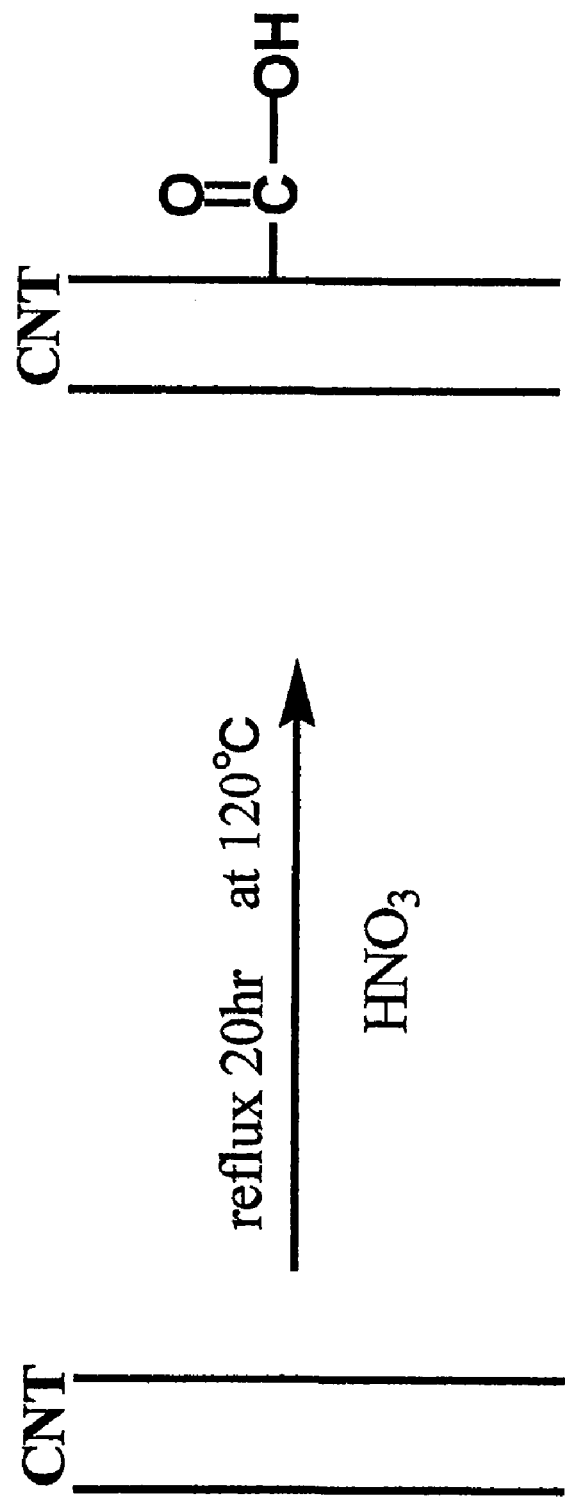
FIG. 2 is a reaction scheme for synthesis of a carbon nanotube carboxylic acid in (Addition Step) in Example 1.

Hereinafter, an example of a method of manufacturing a gas decomposing unit according to the present invention will be described for each step with reference to FIG. 2.

(A) Applying Step

In the present invention, the "applying step" is a step of applying to the surface of the substrate 2 a solution containing a carbon nanotube having a functional group (cross-linking application solution 11).

The application method is not particularly limited, and any method can be adopted from a wide range to apply the cross-linking application solution. For example the liquid may be simply dropped or spread with a squeegee or may be applied by a common application method. Examples of common application methods include spin coating, bar coating, cast coating, roll coating, brush coating, dip coating, spray coating, and curtain coating.

(B) Cross-linking Step

In the present invention, the "cross-linking step" is a step of curing the cross-linking application solution 11 after the application to form a carbon nanotube structure 1 that has a network structure where the plural carbon nanotubes cross-link each other.

An operation carried out in the cross-linking step is naturally determined according to the combination of the functional groups with the cross-linking agent or the additives for chemically bonding the functional groups together. If a combination of thermally curable functional groups is employed, the applied solution is heated by various heaters or the like. If a combination of functional groups that are cured by ultraviolet rays is employed, the applied solution is irradiated with a UV lamp or left under the sun. If a combination of self-curable functional groups is employed, it is sufficient to let the applied solution stand still. Leaving the applied solution to stand still is deemed as one of the operations that may be carried out in the cross-linking step of the present invention.

Heat curing (polyesterification through an ester exchange reaction) is conducted for the case of a combination of a carbon nanotube, to which the functional group —COOR (where R represents a substituted or unsubstituted hydrocarbon group) is added, and a polyol (among them, glycerin and/or ethylene glycol). Heating causes an ester exchange reaction between —COOR of the esterified carbon nanotube carboxylic acid and R'—OH (where R' represents a substituted or unsubstituted hydrocarbon group) of a polyol. As the reaction progresses multilaterally, the carbon nanotubes are cross-linked until a network of carbon nanotubes connected to each other constructs a carbon nanotube structure layer.

To give an example of conditions preferable for the above combination, the heating temperature is specifically set to preferably 50 to 500° C., more preferably 150 to 200° C., and the heating period is specifically set to preferably 1 minute to 10 hours, more preferably 1 hour to 2 hours.

(C) Catalyst Supporting Step

A gas decomposing catalyst may be supported during the step of forming a structure by using a solution containing a carbon nanotube and the gas decomposing catalyst or may be supported after the formation of a carbon nanotube structure. A method including: mixing a carbon nanotube and a gas decomposing catalyst in a solution; and supporting the catalyst on a structure during the process of forming the structure or a method in which a structure is formed from a solution by using a carbon nanotube which supports a fine particle catalyst in advance may be employed for the former case. Those methods increase the degree of freedom for selection of the shape of a decomposing unit. However, if a side reaction that decomposes a supported catalyst or a nanotube supporting the catalyst occurs in a series of steps for forming a structure, it is preferable to support the catalyst after the problem step. A known method (such as sputtering, a chemical carrying method, chemical vapor deposition, vacuum evaporation, pulse laser deposition, or a method of applying a dispersion of particle catalysts) may be used as a supporting method.

(D) Other Steps

A carbon nanotube structure can be manufactured through the above steps. However, the carbon nanotube structure manufacturing method of the present invention may include additional steps.

For instance, it is preferable to put a surface treatment step for pre-treatment of the substrate surface before the application step. The purpose of the surface treatment step is, for example, to enhance the absorption of the cross-linking application solution to be applied, to enhance the adhesion between the substrate surface and the carbon nanotube structure layer to be formed thereon, to clean the substrate surface, or to adjust the electric conductivity of the substrate surface.

An example of surface treatment for enhancing the absorption of the cross-linking application solution is treatment by a silane coupling agent (e.g., aminopropyltriethoxysilane or γ-(2-aminoethyl) aminopropyltrimethoxysilane). Surface treatment by aminopropyltriethoxysilane is particularly widely employed and is preferable for the surface treatment step in the present invention. As documented by Y. L. Lyubchenko et al. in "Nucleic Acids Research vol. 21 (1993)" on pages 1117 to 1123, for example, surface treatment by aminopropyltriethoxysilane has conventionally been employed to treat the surface of a mica substrate for use in observation of AFM of DNA.

In the case where two or more carbon nanotube structure layers are to be layered, the operation of the carbon nanotube structure manufacturing method of the present invention is repeated twice or more. If an intermediate layer such as a dielectric layer or an insulating layer is to be interposed between carbon nanotube structure layers, a step of forming an intermediate layer is inserted in between repeating the operation of the carbon nanotube structure manufacturing method of the present invention.

In addition, if a protective layer, an electrode layer, and other layers are separately laminated, steps of forming these layers are needed. Each of those layers may be appropriately formed by choosing a material and a method corresponding to its purpose from conventionally known materials and methods or by using a material or method newly developed for the present invention.

<Application Example of the Method of Manufacturing Carbon Nanotube Structure of the Present Invention>

As an effective application example of a method of manufacturing a carbon nanotube structure of the present invention, there is a method in which the carbon nanotube structure layer may be patterned on the surface of a temporary substrate and then transferred to a desired substrate. It is also possible to modify this transfer step such that the patterned carbon nanotube structure layer is transferred from the temporary substrate to the surface of an intermediate transfer substrate and then to a desired substrate (second substrate).

The temporary substrate material that can be used in this application example is the same as the substrate material described in the section [Carbon Nanotube Structure]. However, a temporary substrate that has at least one flat surface, more desirably, one that is shaped like a flat plate is preferable for transfer of the carbon nanotube structure layer in the transfer step.

To be employable in this application example, a substrate or an intermediate transfer substrate has to have an adhesive surface holding, or capable of holding, an adhesive. Common tape such as cellophane tape, paper tape, cloth tape, or imide tape can be used in the application example. In addition to the tape and other materials that have plasticity or flexibility, rigid materials may also be employed as a substrate or an intermediate transfer substrate. In the case of a material that does not come with an adhesive, an adhesive is applied to the surface of the material that can hold an adhesive, and then the material can be used in a similar fashion to normal adhesive tape.

According to this application example, the carbon nanotube structure according to the present invention can be manufactured with ease.

It is also possible to manufacture a carbon nanotube structure by preparing a carbon nanotube structure layer that is carried on the surface of a substrate and attaching the carbon nanotube structure layer along with the substrate to the surface of a desired second substrate (for example, a housing).

A carbon nanotube structure can be manufactured while skipping a cross-linking step if a carbon nanotube transfer substrate, which is a temporary substrate (or intermediate transfer substrate) carrying on its surface a carbon nanotube transfer layer, is used, the carbon nanotube structure layer alone is transferred to the surface of a substrate that constitutes the carbon nanotube structure, and then the temporary substrate (or intermediate transfer substrate) is removed. Since the process is structured as such, the intermediate transfer substrate serves as a temporary substrate of the carbon nanotube transfer substrate in some cases. Those cases are included in the present invention because there is no need for the carbon nanotube transfer substrate to discriminate an intermediate transfer substrate from a temporary substrate.

When the carbon nanotube transfer substrate is employed, the carbon nanotube structure layer with carbon nanotubes cross-linked to one another is carried on the surface of the temporary substrate, and this makes the carbon nanotube structure layer very easy to handle in the subsequent steps. As a result, manufacture of a carbon nanotube structure is greatly facilitated. To remove the temporary substrate, an appropriate method is chosen from simple peeling, chemical decomposition, burn-off, melting, sublimation, dissolution, and the like.

The carbon nanotube structure manufacturing method of this application example is effective particularly when a substrate of a device has a material and/or shape that make it difficult to apply the method of manufacturing a carbon nanotube structure according to the present invention without some changes.

For instance, the application example of the present invention is effective when the temperature at which the applied solution is cured in Cross-linking Step is equal to or higher than the melting point or glass transition temperature of the material that is to be used as a substrate of the carbon nanotube structure. In this case, the heating temperature is set lower than the melting point of the temporary substrate to ensure a heating temperature necessary for the curing, and thus the carbon nanotube structure according to the present invention can be manufactured appropriately.

The carbon nanotube structure according to the present invention is made easy to handle even more if a substrate that carries a carbon nanotube structure layer is pasted onto a second substrate. The obtained carbon nanotube structure can be used to build a device. The second substrate may be physically rigid or may be plastic or flexible, and can take various shapes including a spherical shape and a concave-convex shape.

EXAMPLES

A more specific description of the present invention is given below through Examples. However, the present invention is not limited to the following example.

A gas decomposing unit was manufactured through a flow of the method of manufacturing a gas decomposing unit shown in FIG. 1. It should be noted that reference numerals in FIG. 1 may be used in the description of this example.

(A) Applying Step (A-1) Preparation of Cross-linking Application Solution (Addition Step)

Figure 3:
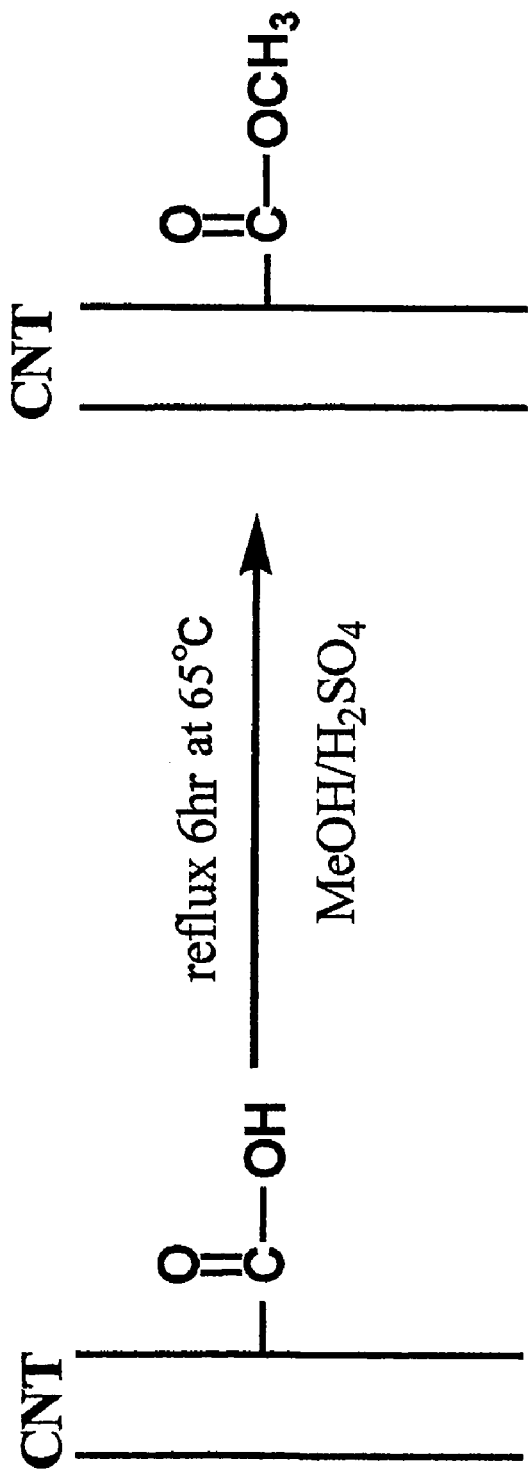
FIG. 3 is a reaction scheme for esterification in (Addition Step) in Example 1.

(1) Addition of Carboxyl Group . . . Synthesis of Carbon Nanotube Carboxylic Acid 30 mg of multi-wall carbon nanotube powder (purity: 90%, average diameter: 30 nm, average length: 3 µm, available from Science Laboratory Inc.) were added to 20 ml of concentrated nitric acid (a 60 mass % aqueous solution, available from KANTO KAGAKU) for reflux at 120° C. for 20 hours to synthesize a carbon nanotube carboxylic acid. A reaction scheme of the above is shown in FIG. 3. In FIG. 3, a carbon nanotube (CNT) is represented by two parallel lines (same applies for other figures relating to reaction scheme).

The temperature of the solution was returned to room temperature and the solution was centrifuged at 5,000 rpm for 15 minutes to separate supernatant liquid from a precipitate. The recovered precipitate was dispersed in 10 ml of pure water, and the dispersion solution was subjected to centrifugal separation again at 5,000 rpm for 15 minutes to separate supernatant liquid from a precipitate (the above process constitutes one washing operation). This washing operation was repeated five more times and lastly a precipitate was recovered.

An infrared absorption spectrum of the recovered precipitate was measured. An infrared absorption spectrum of the used multi-wall carbon nanotube raw material itself was also measured for comparison. A comparison between both the spectra revealed that absorption at 1,735 cm$^{-1}$ characteristic of a carboxylic acid, which was not observed in the multi-wall carbon nanotube raw material itself, was observed in the precipitate. This finding shows that a carboxyl group was introduced into a carbon nanotube by the reaction with nitric acid. In other words, this finding confirmed that the precipitate was a carbon nanotube carboxylic acid.

Addition of the recovered precipitate to neutral pure water confirmed that dispersability was good. This result supports the result of the infrared absorption spectrum that a hydrophilic carboxyl group was introduced into a carbon nanotube.

Figure 4:
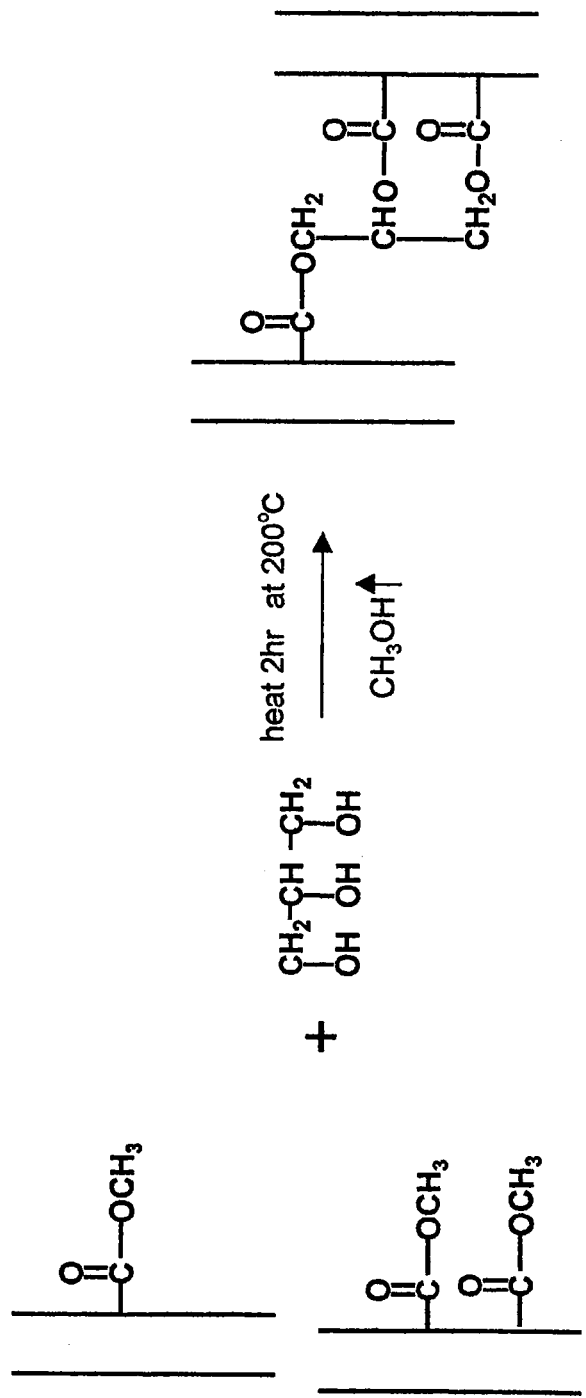
FIG. 4 is a reaction scheme for cross-linking through an ester exchange reaction in (Cross-linking Step) in Example 1.

(2) Esterification 30 mg of the carbon nanotube carboxylic acid prepared in the above step were added to 25 ml of methanol (available from Wako Pure Chemical Industries, Ltd.). Then, 5 ml of concentrated sulfuric acid (98 mass %, available from Wako Pure Chemical Industries, Ltd.) were added to the mixture, and reflux was conducted at 65° C. for 6 hours for methyl esterification. The reaction scheme for the above-mentioned methyl esterification is shown in FIG. 4.

After the temperature of the solution had been recovered to room temperature, the solution was filtered to separate a precipitate. The precipitate was washed with water, and was then recovered. An infrared absorption spectrum of the recovered precipitate was measured. As a result, absorption at 1,735 cm$^{-1}$ and that in the range of 1,000 to 1,300 cm$^{-1}$ characteristic of ester were observed. This observation confirmed that the carbon nanotube carboxylic acid was esterified.

(Mixing Step)

30 mg of the carbon nanotube carboxylic acid methyl esterified in the above step were added to 4 g of glycerin (available from KANTO KAGAKU) and the whole was mixed using an ultrasonic disperser. Further, the mixture was added to 4 g of methanol as a viscosity modifier to prepare a cross-linking application solution (1).

(A-3) Applying Step

The cross-linking application solution (1 µl) prepared in Step (A-1) was applied to a molecular sieve (manufactured by Anelva Corporation, 13×, 1/8).

(B) Cross-linking Step

After the cross-linking application solution had been applied, the molecular sieve having formed thereon a coat was heated at 200° C. for 2 hours to cure the coat, thereby resulting in a carbon nanotube structure layer 1.

(Verification Experiment)

Figure 5:
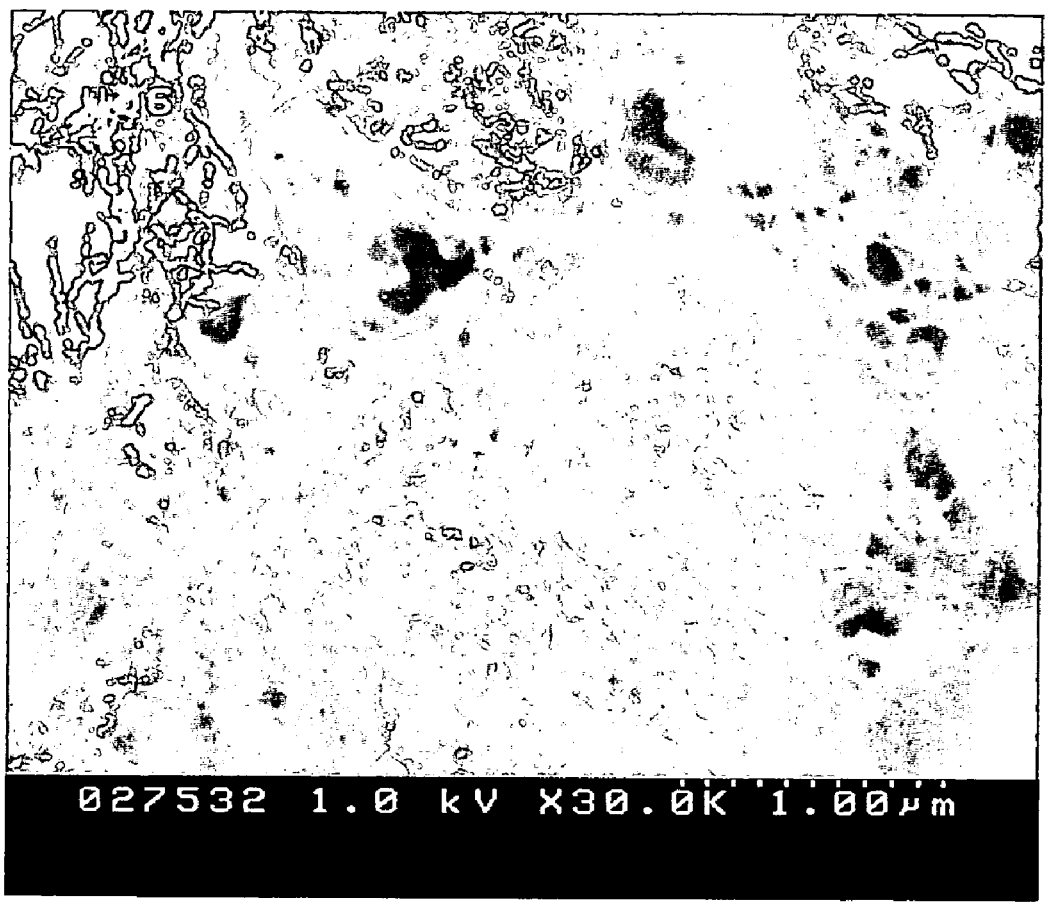
FIG. 5 is an electron micrograph (at a magnification of ×30,000) of a gas decomposing catalyst in which platinum fine particles are supported on a carbon nanotube structure layer formed on a molecular sieve in Example 1.

Platinum fine particles were deposited by ion sputtering on the nanotube structure obtained in Example 1 to prepare a gas decomposing unit. It should be noted that a platinum fine particle is generally used as a gas decomposing catalyst having an action of decomposing $NO_x$ in an exhaust gas. The surface of the resultant catalyst was observed with an electron microscope. As shown in FIG. 5, this observation confirmed that a nanotube structure layer was evenly formed on the molecular sieve surface having a complex shape. In addition, an energy dispersive X-ray analyzer confirmed that the platinum fine particles were supported on the nanotube.

According to the present invention, a gas decomposing catalyst is supported on a structured carbon nanotube structure, so that the carbon nanotube structure can be stably used as a gas decomposing unit. In addition, if the carbon nanotube structure is used as an electrode as well, excellent electric conductivity can be obtained.

What is claimed is:

1. A gas decomposing unit comprising:
   a carbon nanotube structure having a mesh structure in which functional groups bonded to plural carbon nanotubes are chemically bonded to mutually cross-link the plural carbon nanotubes; and
   a gas decomposing catalyst supported on the carbon nanotube structure.

2. A gas decomposing unit according to claim 1, wherein the carbon nanotube structure is manufactured by curing a solution containing plural carbon nanotubes to which functional groups are bonded to chemically bond the plural functional groups bonded to the carbon nanotubes to form a cross-linked site.

3. A gas decomposing unit according to claim 2, wherein the cross-linked site is structured by cross-linking the plural functional groups with a cross-linking agent in the solution, and the cross-linking agent is not self-polymerizable.

4. A gas decomposing unit according to claim 1, wherein the cross-linked site where plural carbon nanotubes mutually cross-link has a chemical structure selected from the group consisting of —COO(CH$_2$)$_2$OCO—, —COOCH$_2$CHOHCH$_2$OCO—, —COOCH$_2$CH(OCO—)CH$_2$OH, and —COOCH$_2$CH(OCO—)CH$_2$OCO—.

5. A gas decomposing unit according to claim 2, wherein the cross-linked site is formed through chemical bonding of the plural functional groups.

6. A gas decomposing unit according to claim 5, wherein a reaction forming the chemical bonding is selected from the group consisting of dehydration condensation, a substitution reaction, an addition reaction, and an oxidative reaction.

7. A gas decomposing unit according to claim 1, wherein the cross-linked site where plural carbon nanotubes mutually cross-link comprises a cross-linked site selected from the group consisting of —COOCO—, —O—, —NHCO—, —COO—, —NCH—, —NH—, —S—, —O—, —NHCOO—, and —S—S—.

8. A gas decomposing unit according to claim 1, wherein the plural carbon nanotubes comprise multi-wall carbon nanotubes.

9. An electrode for a fuel cell comprising the gas decomposing unit according to claim 1, wherein the carbon nanotube structure serves as one side of the electrode.

10. A method of manufacturing a gas decomposing unit comprising:
    an applying step of applying, to a surface of a substrate, a solution containing plural carbon nanotubes to which functional groups are bonded;
    a cross-linking step of chemically bonding the functional groups to build a mesh structure in which the plural carbon nanotubes mutually cross-link; and
    a supporting step of forming the carbon nanotube structure supporting a gas decomposing catalyst.

11. A method of manufacturing a gas decomposing unit according to claim 10, wherein the solution to be used in the applying step contains the gas decomposing catalyst.

12. A method of manufacturing a gas decomposing unit according to claim 10, wherein the supporting step comprises a supplying step of supplying the gas decomposing catalyst onto the carbon nanotube structure.

13. A method of manufacturing a gas decomposing unit according to claim 12, wherein the gas decomposing catalyst comprises a catalyst having a characteristic of decomposing a carbon nanotube in one of the solution and the cross-linking step.

14. A method of manufacturing a gas decomposing unit according to claim 10, wherein:
the solution contains a cross-linking agent that cross-links the plural functional groups together; and
the cross-linking agent is not self-polymerizable.

15. A method of manufacturing a gas decomposing unit according to claim 14, wherein:
each of the functional groups is selected from the group consisting of —OH, —COOH, —COOR (where R represents a substituted or unsubstituted hydrocarbon group), —COX (where X represents a halogen atom), —NH$_2$, and —NCO; and
the cross-linking agent is capable of prompting a cross-linking reaction with the selected functional groups.

16. A method of manufacturing a gas decomposing unit according to claim 14, wherein:
the cross-linking agent is selected from the group consisting of a polyol, a polyamine, a polycarboxylic acid, a polycarboxylate, a polycarboxylic acid halide, a polycarbodiimide, and a polyisocyanate; and
each of the functional groups is capable of prompting a cross-linking reaction with the selected cross-linking agent.

17. A method of manufacturing a gas decomposing unit according to claim 14, wherein:
each of the functional groups is selected from the group consisting of —OH, —COOH, —COOR (where R represents a substituted or unsubstituted hydrocarbon group), —COX (where X represents a halogen atom), —NH$_2$, and —NCO;
the cross-linking agent is selected from the group consisting of a polyol, a polyamine, a polycarboxylic acid, a polycarboxylate, a polycarboxylic acid halide, a polycarbodiimide, and a polyisocyanate; and
the functional groups and the cross-linking agent are respectively selected for a combination capable of prompting a mutual cross-linking reaction.

18. A method of manufacturing a gas decomposing unit according to claim 15, wherein each of the functional groups comprises —COOR (where R represents a substituted or unsubstituted hydrocarbon group).

19. A method of manufacturing a gas decomposing unit according to claim 16, wherein the cross-linking agent comprises a polyol.

20. A method of manufacturing a gas decomposing unit according to claim 16, wherein the cross-linking agent is selected from the group consisting of glycerin, ethylene glycol, butenediol, hexynediol, hydroquinone, and naphthalenediol.

21. A method of manufacturing a gas decomposing unit according to claim 10, wherein the solution further contains a solvent.

22. A method of manufacturing a gas decomposing unit according to claim 14, wherein the cross-linking agent also functions as a solvent.

23. A method of manufacturing a gas decomposing unit according to claim 10, wherein a reaction forming the chemical bonding comprises a reaction for chemically bonding the plural functional groups.

24. A method of manufacturing a gas decomposing unit according to claim 23, wherein the solution further contains an additive that chemically bonds the plural functional groups.

25. A method of manufacturing a gas decomposing unit according to claim 24, wherein the reaction comprises dehydration condensation and the additive comprises a condensation agent.

26. A method of manufacturing a gas decomposing unit according to claim 25, wherein each of the functional groups is selected from the group consisting of —COOR (where R represents a substituted or unsubstituted hydrocarbon group), —COOH, —COX (where X represents a halogen atom), —OH, —CHO—, and —NH$_2$.

27. A method of manufacturing a gas decomposing unit according to claim 25, wherein each of the functional groups comprises —COOH.

28. A method of manufacturing a gas decomposing unit according to claim 25, wherein the condensation agent is selected from the group consisting of sulfuric acid, N-ethyl-N'-(3-dimethylaminopropyl)carbodiimide, and dicyclohexyl carbodiimide.

29. A method of manufacturing a gas decomposing unit according to claim 24, wherein the reaction comprises a substitution reaction and the additive comprises a base.

30. A method of manufacturing a gas decomposing unit according to claim 29, wherein each of the functional groups is selected from the group consisting of —NH$_2$, —X (where X represents a halogen atom), —SH, —OH, —OSO$_2$CH$_3$, and —OSO$_2$(C$_6$H$_4$)CH$_3$.

31. A method of manufacturing a gas decomposing unit according to claim 29, wherein the base is selected from the group consisting of sodium hydroxide, potassium hydroxide, pyridine, and sodium ethoxide.

32. A method of manufacturing a gas decomposing unit according to claim 23, wherein the reaction comprises an addition reaction.

33. A method of manufacturing a gas decomposing unit according to claim 32, wherein each of the functional groups is chosen from the group consisting of —OH and —NCO.

34. A method of manufacturing a gas decomposing unit according to claim 23, wherein the reaction comprises an oxidative reaction.

35. A method of manufacturing a gas decomposing unit according to claim 34, wherein each of the functional groups comprises —SH.

36. A method of manufacturing a gas decomposing unit according to claim 34, wherein the solution further contains an oxidative reaction accelerator.

37. A method of manufacturing a gas decomposing unit according to claim 36, wherein the oxidative reaction accelerator comprises iodine.

* * * * *